United States Patent
Bouet et al.

Patent Number: 5,460,898
Date of Patent: Oct. 24, 1995

[54] HYDRIDABLE MATERIAL FOR THE NEGATIVE ELECTRODE OF A NICKEL-HYDRIDE STORAGE CELL, AND A METHOD OF PREPARING THE MATERIAL

[75] Inventors: Jacques Bouet, Paris; Bernard Knosp, Neuilly sur Seine; Annick Percheron-Guegan, Le Kremlin Bicetre; Christian Jordy, Eix Abaucourt, all of France

[73] Assignee: Societe Anonyme Dite Saft, Romainville, France

[21] Appl. No.: 967,853

[22] Filed: Oct. 28, 1992

[30] Foreign Application Priority Data

Jun. 3, 1992 [FR] France .................. 92 06732

[51] Int. Cl.$^6$ .................. H01M 10/34; H01M 10/52; C01B 6/24
[52] U.S. Cl. .................. 429/59; 420/900
[58] Field of Search .................. 429/59; 420/900

[56] References Cited

U.S. PATENT DOCUMENTS

| | | | |
|---|---|---|---|
| 3,824,131 | 7/1974 | Beccu | 136/20 |
| 4,160,014 | 7/1979 | Gamo et al. | 420/900 |
| 4,551,400 | 11/1985 | Sapru et al. | 429/59 |
| 4,728,586 | 3/1988 | Venkatesan | 420/900 |
| 5,008,164 | 4/1991 | Furukawa et al. | 429/59 |
| 5,043,233 | 8/1991 | Kameoka et al. | 429/59 |
| 5,128,219 | 7/1992 | Kohler et al. | 429/59 |

FOREIGN PATENT DOCUMENTS

| | | |
|---|---|---|
| 0273625 | 7/1988 | European Pat. Off. . |
| 0484964 | 5/1992 | European Pat. Off. . |
| 2623271 | 5/1989 | France . |
| 0103542 | 9/1978 | Japan .................. 429/59 |
| 1443163 | 7/1976 | United Kingdom .................. 429/59 |

OTHER PUBLICATIONS

Journal of the Less–Common Metals, 131 (1987) 311–319, "Capacities and Durabilities of Ti–Zr–Ni Alloy Hydride Electrodes and Effects of Electroless Plating on Their Performances", Wakao et al.

Journal of the Less–Common Metals, 104 (1984) 365–373, "Electrochemical Capacities and Corrosion of TiNi$_x$ And Its Zirconium–Substituted Alloy Hydride Electrodes", Wakao, et al.

Journal of the Less–Common Metals, 172–174 (1991) 1236–1245, "A New Pressure–Composition–Temperature Curve Application: Potential of the MH Electrode", Jordy, et al.

*Primary Examiner*—David B. Springer
*Attorney, Agent, or Firm*—Sughrue, Mion, Zinn, Macpeak & Seas

[57] ABSTRACT

The material is derived from the compound TiNi, is a single-phase material and is expressed by the following general formula:

$$(Ti_{[1-(x+y)]}Zr_xM_y)Ni_z$$

where:

$0.05 \leq (x + y) \leq 0.5$;
$y \leq 0.15$; and
$0.9 \leq z \leq 1.2$;

where M is chosen from vanadium V, silicon Si, and a combination of vanadium and of silicon. Preferably, the hydridable material satisfies the following formulae:

$$(Ti_{0.7}Zr_{0.2}V_{0.1})Ni$$

or $$(Ti_{0.5}Zr_{0.4}Si_{0.1})Ni$$

The hydridable material is a single-phase material and has a body-centered cubic lattice, with a lattice parameter of about 3 Å.

7 Claims, 2 Drawing Sheets

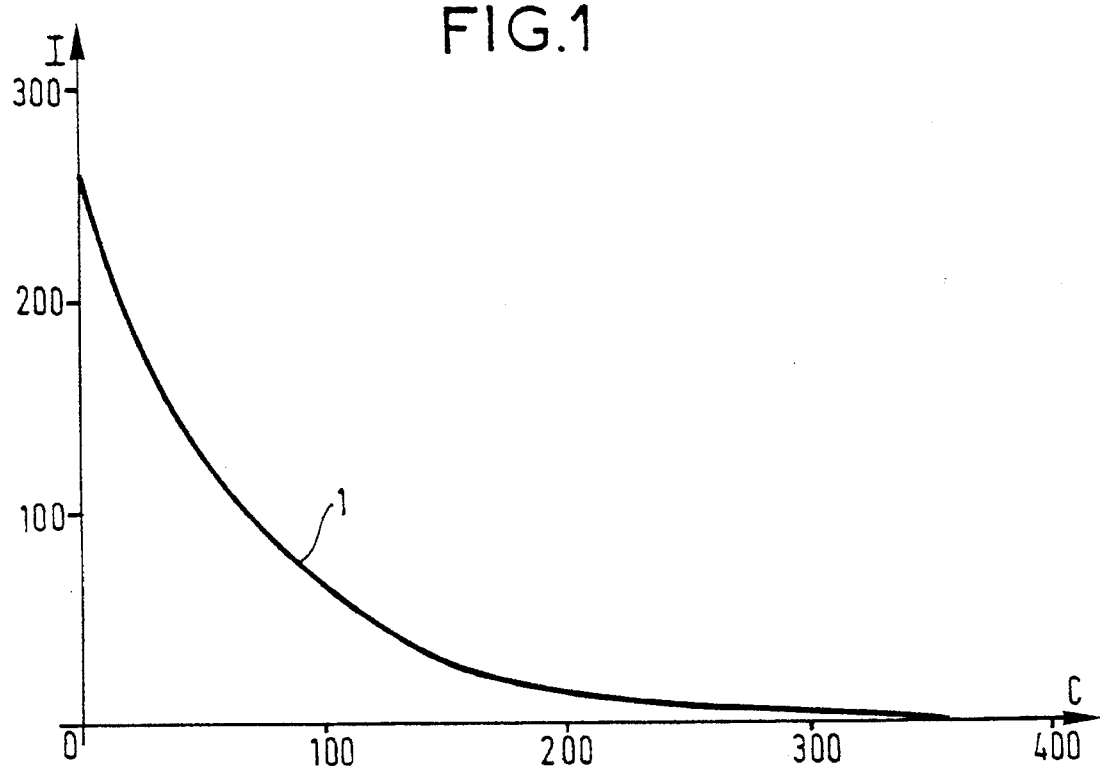
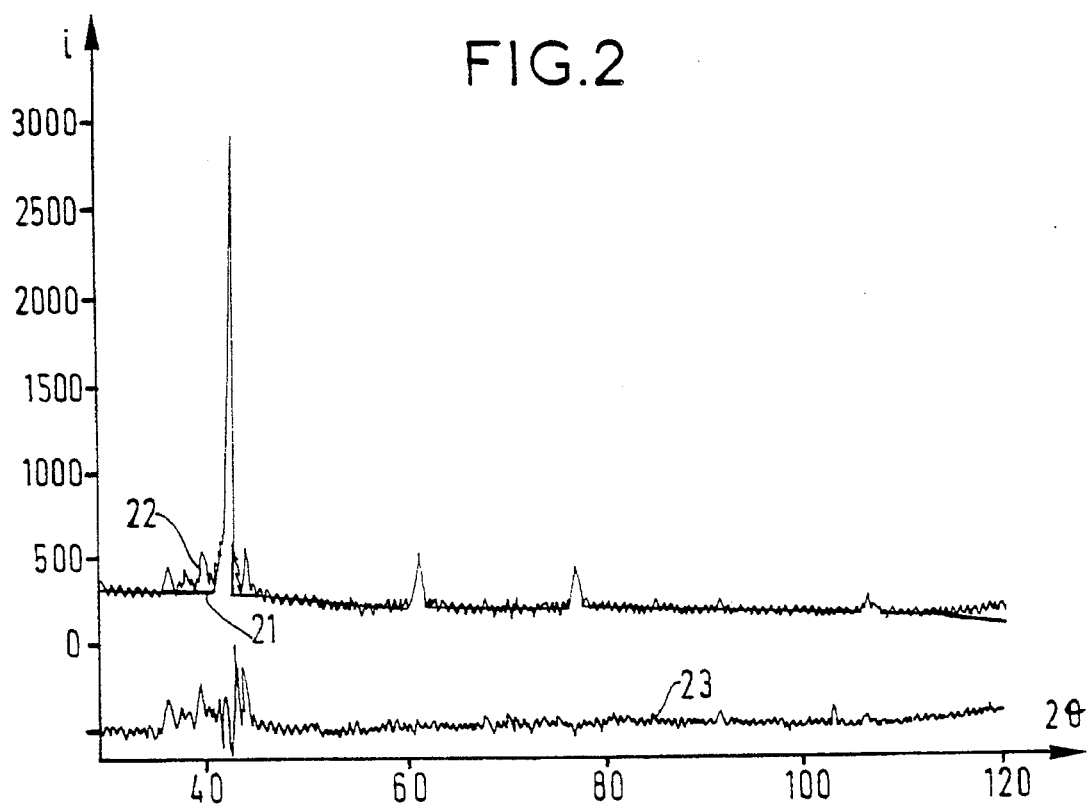

HYDRIDABLE MATERIAL FOR THE NEGATIVE ELECTRODE OF A NICKEL-HYDRIDE STORAGE CELL, AND A METHOD OF PREPARING THE MATERIAL

This invention relates to a hydridable material for the negative electrode of a nickel-hydride storage cell, and to a method of preparing the material.

In certain applications, nickel-cadmium storage cells are being replaced by nickel-hydride storage cells. Sealed nickel-hydride storage cells are alkaline storage cells having an aqueous electrolyte. The reagent, which is constituted by hydrogen, is stored in the mass of the hydridable alloy which is capable of absorbing large quantities thereof. Depending on whether the storage cell is being charged or discharged, such an alloy must be capable of taking up hydrogen and of restoring it at sufficient speed under normal operating conditions. Its electrochemical capacity must also be higher than that of cadmium, it must withstand corrosion in potassium hydroxide, and it must not be toxic.

Currently, the main alloys used are hydridable alloys of the $AB_5$ type, derived from $LaNi_5$, because of their good chemical stability. Such materials are already produced industrially, and in practice they have a capacity per unit mass of about 300 mAh/g (and of about 350 mAh/g in theory), thereby making it possible to achieve energy per unit mass of 55 Wh/kg, and energy per unit volume of 175 Wh/l in a sealed spiral component. They have now reached a stage of maturity that makes it difficult to increase their electrochemical performance levels any further.

Other classes of hydridable materials do exist, such as alloys of the $AB_2$ type.

U.S. Pat. No. 4,551,400 describes alloys of the $AB_2$ type derived from the TiV system, which alloys are preferably multiphase and rich in vanadium, and satisfy the following formulae:

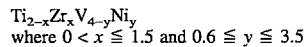
where $0 < x \leq 1.5$ and $0.6 \leq y \leq 3.5$ and

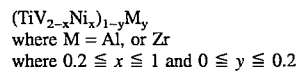
where M = Al, or Zr
where $0.2 \leq x \leq 1$ and $0 \leq y \leq 0.2$

Patent application EP-A-0 293 660 describes alloys of the $AB_a$ type, where a lies in the range 1 to 2.5, which alloys include at least one phase of the "Laves phase" type whose crystal structure is C14-type hexagonal ($MgZn_2$), or C15-type cubic ($MgCu_2$), with a lattice parameter lying in the range 6.92 Å to 7.7 Å.

Producing such materials industrially suffers from problems arising from their high oxidizability in air, their vulnerability to being corroded by electrolyte, and their passivation when they are used in electrodes.

Much research has also been done into intermetallic compounds of the AB type, derived from the TiFe, TiCr, TiCo, and TiNi systems.

Patent application JP-A-87 184 765 refers to alloys of the $AB_a$ type, where a lies in the range 0.85 to 1.15, which alloys are derived from TiFe, where the metal M replaces some of the iron, and have the following generic formula:

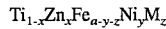

where $0.01<x<0.4$; $0.85 \leq a<1.15$; $a-y-z \geq 0.4$; $z \leq 0.5$; and where M=Mg, Ca, V, Nb, Cr, Mo, Mn, Cu, Zn, B, Al, C, Si, Sn, and in particular Co.

Patent application JP-A-86 176 065 relates to alloys also derived from TiFe in which some of the Ti is replaced in particular by Ta or Zr, and some of the Fe is replaced by Al or Mn, for example.

Alloys derived from TiCr by replacing Ti with La or Zr, for example, and by replacing Cr in particular with Al or Mn, are referred to in patent application JP-A-86 176 067.

Patent application JP-A-86 288 373 relates to alloys derived from the TiCo system by replacing Co with Al.

Currently, none of those alloys are used because of their poor resistance to corrosion.

Alloys derived from the TiNi system are described in patent application JP-A-86 288 372, which alloys are obtained by partially replacing Ni with Si, V, Mn, Zn, Nb, Mo, and in particular with Al.

The TiNi system undergoes austenitic-to-martensitic transformation at about ambient temperature. Therefore, there is a danger that its hydrogen absorption might be modified randomly by the coexistence of a plurality of crystal phases. It is essential to stabilize the structure of the system in order to be able to use it in a nickel-hydride storage cell.

In U.S. Pat. No. 3,824,131, the alloys derived from the TiNi system are constituted by a mixture of two phases: TiNi and $Ti_2Ni$. Although the electrochemical capacity of those materials is initially high, and although they withstand corrosion well in potassium hydroxide, the way the crystal structure changes during the charge/discharge cycles, in particular with the formation of a phase that is rich in titanium, makes hydrogen desorption progressively more difficult.

In order to avoid performance levels deteriorating during cycling, it is necessary to find a family of alloys whose crystal structure remains very stable during a hydrogen absorption/desorption cycle.

The ever-increasing needs of the market require an increase in the energy per unit volume of storage cells. For certain applications, e.g. in portable tools, an increase in energy per unit mass is also necessary.

An object of the present invention is to increase both the capacity per unit volume and the capacity per unit mass of nickel-hydride storage cells, by providing a class of hydridable alloys for making negative electrodes, which alloys offer capacities and physical and chemical properties that are improved over prior materials.

The present invention provides a hydridable material for the negative electrode of a nickel-hydride storage cell, the material being derived from the compound TiNi, and being characterized in that it is a single-phase material and has the following general formula:

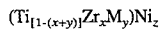

where:

$0.05 \leq (x + y) \leq 0.5$;
$y \leq 0.15$; and
$0.9 \leq z \leq 1.2$;

where M is chosen from vanadium V, silicon Si, and a combination of vanadium and of silicon.

Said hydridable material is a single-phase material, and has a body-centered cubic lattice, with a lattice parameter of about 3 Å. The alloy obtained has a cubic austenitic structure of the CsCl type. The purpose of the replacement vanadium and/or silicon is to stabilize the austenitic structure of the alloy, in order to prevent it from changing into a martensitic structure as it does with TiNi. The zirconium makes it possible to increase the solid-gas and electrochemical capacities of the alloy.

Preferably, x lies in the range 0.15 to 0.25, y lies in the range 0.05 to 0.15, the atomic ratio $(Ti_{[1-(x+y)]}Zr_xM_y)$ over $Ni_z$ lies in the range 0.95 to 1.05, and M is vanadium V. In one embodiment, the material is of the following type:

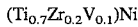
$(Ti_{0.7}Zr_{0.2}V_{0.1})Ni$

Also preferably, x lies in the range 0.35 to 0.45, y lies in the range 0.05 to 0.15, the atomic ratio $(Ti_{[1-(x+y)]}Zr_xM_y)$ over $Ni_z$ lies in the range 0.95 to 1.05, and M is silicon Si. In another embodiment, the material is of the type:

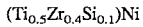
$(Ti_{0.5}Zr_{0.4}Si_{0.1})Ni$

The observed variation in volume after the material of the invention has been hydrided is less than 15%.

The present invention also provides a method of making a hydridable material, characterized in that it comprises melting together the constituent metals of the alloy, then in cooling the alloy to 1,150° C., then in keeping the alloy at that temperature for 5 minutes, and then quenching it.

The present invention also provides a method of implementing the hydridable material in powder form, in which the material is reduced to powder form by being hydrided, by performing successive absorption/desorption cycles. The powder can then be used for making a negative electrode for a nickel-hydride storage cell.

Finally, the present invention provides a negative electrode for a nickel-hydride storage cell, the electrode including a single-phase hydridable material having the following general formula:

$(Ti_{[1-(x+y)]}Zr_xM_y)Ni_z$ where:

$0.05 \leq (x + y) \leq 0.5;$
$y \leq 0.15;$ and
$0.9 \leq z \leq 1.2;$ where M is chosen from vanadium V, silicon Si, and a combination of vanadium and of silicon.

Such an electrode comprises a conductive support (a nickel sponge or a perforated and nickel-plated steel strip) on which a mixture is deposited, the mixture comprising the hydride powder, a conductive powder, such as carbon, optionally containing platinum or palladium, and an organic binder, such as a polymer such as PTFE.

Other characteristics and advantages of the present invention appear on reading the following description of an embodiment given by way of non-limiting example and with reference to the accompanying drawings, in which:

BRIEF DESCRIPTION OF THE DRAWINGS

FIG. 1 shows the constant-polarization electrochemical discharge curve of the alloy $(Ti_{0.70}Zr_{0.22}V_{0.08})Ni$;

FIG. 2 shows the X-ray diffraction pattern of the same alloy;

Figure 3:
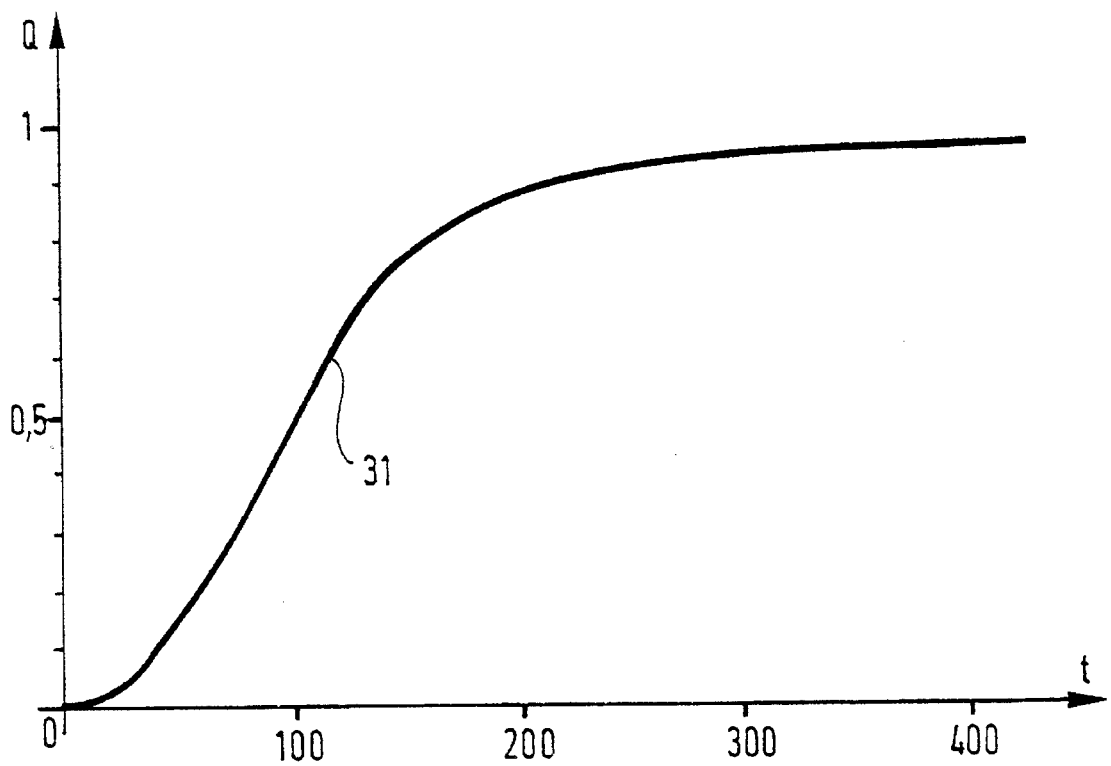
FIG. 3 shows the curve of first hydrogenation of the same alloy under 30 bars and at 25° C.

By way of example, in order to make the alloy $(Ti_{0.70}Zr_{0.22}V_{0.08})Ni$, the method included the following steps:

a mixture was made of the constituent metals at high purity (3N to 5N) in a vacuum ($10^{-6}$ mbars);

the ingot was homogenized by being melted on five successive occasions in a secondary vacuum in an induction furnace, the ingot being placed in a water-cooled copper crucible; the sample being turned over before each new melt; and after being melted for the last time, the alloy was cooled to 1,150° C., was then kept at that temperature for 5 minutes, and was then quenched.

The resulting alloy was thereafter reduced to a powder by being hydrogenated on successive occasions. Prior to the first absorption, the sample was degassed at 130° C. for 12 hours. During the first absorption, the initial hydrogen pressure was 70 bars at 25° C. The capacity absorbed was 1.9 hydrogen atoms/mole at a pressure of 48 bars at 25° C. Hydrogen desorption was performed by degassing the sample at 350° C. for 3 hours in a primary vacuum. In all, three absorption/desorption cycles were performed.

The powder was then transferred to a glove box, and was ground therein in argon so that a grain-size of less than 36 μm was obtained. The powder was then compressed under a pressure of 10 metric tons/cm². The resulting pellet was cylindrical in shape, 9 mm in diameter, 1.2 mm thick, and its porosity was 31%. The pellet was then sintered at 900° C. for 4 hours in the induction furnace and in a secondary vacuum.

The pellet was used for performing a discharge at constant polarization. The potential was fixed at −800 mV relative to a mercury Hg/HgO mercuric oxide electrode and the electrolyte was 8.7N potassium hydroxide KOH. FIG. 1 shows the curve 1 obtained, where C represents capacity in mAh/g and I represents current in mA/g. The maximum discharged capacity was 350 mAh/g, i.e. 50% greater than TiNi.

The same powder was also used to obtain the X-ray diffraction pattern of the alloy $(Ti_{0.70}Zr_{0.22}V_{0.08})Ni$. The pattern was obtained at 20° C. by using the Kα line of copper (λ=1.54178 Å), and a graphite monochromator. FIG. 2 compares the theoretical spectrum 21, obtained after fining down the lines by using the Rietveld method, with the experimental spectrum 22, by showing the difference between the two spectrums 23. i is line intensity, and 2Θ is the angle of diffraction. The spectrum was indexed in the CsCl-type body-centered cubic system (space group Pm3m) with a lattice parameter of 3.043 Å.

A first solid-to-gas hydrogenation was performed on the alloys reduced to powder form, under the following conditions: after being degassed for 12 hours at 130° C., the sample was subjected to a pressure of 30 bars of hydrogen at 25° C. FIG. 3 shows the hydrogenation curve 31 that was obtained. t is time in minutes and Q is absorption capacity in hydrogen atoms/metal atom.

In addition, after being degassed for 12 hours at 130° C., the sample was subjected to a pressure of 60 bars of hydrogen at 25° C. After three absorption-desorption cycles, the absorption reaction speed was relatively high, with 90% of the total capacity being obtained after 4 minutes at 25° C.

The maximum capacity that could be obtained was 0.95 hydrogen atoms/metal atom at 10 bars and at 25° C., i.e. 35% greater than the compound TiNi. The structure of the hydride was still CsCl-type cubic, with a lattice parameter of 3.15 Å. The increase in volume was about 11%.

Figure 4:
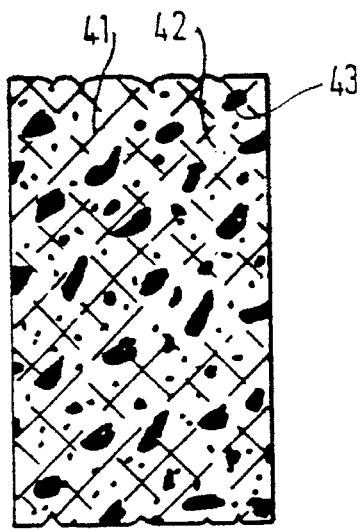
FIG. 4 is a diagram showing a negative electrode for a nickel-hydride storage cell, which electrode is made from the hydridable material of the invention.

The hydridable material was intended for use in making the negative electrode of a nickel-hydride storage cell. The electrode is shown in FIG. 4, and it includes a support 41 made of perforated and nickel-plated steel strip. The support may be embossed prior to use, thereby making it easier for it to be coated with a substance during electrode preparation. The support 41 was coated with a paste 42 containing an organic binder, namely PTFE, a conductive powder, namely carbon, and the hydridable alloy 43 in powder form. The resulting assembly was then dried and compressed so as to obtain final porosity of 20% to 40%. After drying, the composition per unit mass of the paste 42 was as follows: 93% hydridable alloy 43, 2% PTFE, and 5% carbon.

The electrode may be used in all types of nickel-hydride storage cell, in particular in sealed rectangular-block shaped storage cells. Advantageously, the electrode may be used in applications in which it must be possible to recharge the storage cell in less than 1 hour.

Naturally, the present invention is not limited to the embodiment described, and any other method resulting in the same material being obtained may be considered. In particular, the methods of formulating or of implementing the material containing vanadium are also applicable to the material containing silicon, or a combination of vanadium and silicon. Variants on the method of formulating or of implementing the material are also possible. In particular, the material may be reduced to powder form by using any other conventional grinding technique.

We claim:

1. A hydridable material for the negative electrode of a nickel-hydride storage cell, the material being derived from the compound TiNi, and being characterized in that it is a single-phase material and has the following general formula:

$$(Ti_{[1-(x+y)]}Zr_xM_y)Ni_z$$

where:

$0.05 \leq (x + y) \leq 0.5$;
$y \leq 0.15$; and
$0.9 \leq z \leq 1.2$;

where M is chosen from vanadium V, silicon Si, and a combination of vanadium and of silicon.

2. A hydridable material according to claim 1, characterized in that it is a single-phase material, and has a body-centered cubic lattice, with a lattice parameter of about 3 Å.

3. A hydridable material according to claim 1, characterized in that x lies in the range 0.15 to 0.25, y lies in the range 0.05 to 0.15, the atomic ratio $(Ti_{[1-(x+y)]}Zr_xM_y)$ over $Ni_z$ lies in the range 0.95 to 1.05, and M is vanadium V.

4. A hydridable material according to claim 1, characterized in that x lies in the range 0.35 to 0.45, y lies in the range 0.05 to 0.15, the atomic ratio $(Ti_{[1-(x+y)]}Zr_xM_y)$ over $Ni_z$ lies in the range 0.95 to 1.05, and M is silicon Si.

5. A material of claim 1 when made by the process of comprising:

melting together the constituent metal of the alloy;

cooling the alloy to 1,150° C. to form a solid alloy at that temperature;

keeping said alloy at that temperature for 5 minutes to homogenize the alloy temperature and stabilize the solid alloy as a single phase structure; and thereafter quenching said alloy to keep the single phase structure, thereby preventing the formation of a multi-phase alloy.

6. A method of making a hydridable material for a negative electrode of a nickel-hydride storage cell, said material being derived from the compound TiNi and having the following general formula:

$$(Ti_{[1-(x+y)]}Zr_xM_y)Ni_z$$

where:

$0.05 \leq (x + y) \leq 0.5$;
$y \leq 0.15$; and
$0.9 \leq z \leq 1.2$;

where M is chosen from vanadium V, silicon Si, and a combination of vanadium and of silicon; said method comprising the steps of:

melting together the constituent metal of the alloy;

cooling the molten alloy down to about 1,150° C., thereby forming a solid alloy as a single phase structure;

keeping said solid alloy, single phase structure at this temperature to homogenize the alloy temperature and stabilize the single phase structure; and thereafter quenching said alloy to maintain said single phase structure alloy.

7. A negative electrode for a nickel-hydride storage cell, the electrode including a hydridable material and being characterized by the fact that said hydridable material is a single-phase material and has the following general formula:

$$(Ti_{[1-(x+y)]}Zr_xM_y)Ni_z$$

where:

$0.05 \leq (x + y) \leq 0.5$;
$y \leq 0.15$; and
$0.9 \leq z \leq 1.2$;

where M is chosen from vanadium V, silicon Si, and a combination of vanadium and of silicon.

* * * * *